(12) United States Patent
Nakajima

(10) Patent No.: US 9,227,465 B2
(45) Date of Patent: Jan. 5, 2016

(54) BICYCLE WHEEL SECURING STRUCTURE

(71) Applicant: Shimano Inc., Sakai, Osaka (JP)

(72) Inventor: Jun Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 323 days.

(21) Appl. No.: 13/863,598

(22) Filed: Apr. 16, 2013

(65) Prior Publication Data

US 2014/0306512 A1    Oct. 16, 2014

(51) Int. Cl.
*B60B 35/00* (2006.01)
*B60B 27/02* (2006.01)
*B62K 25/04* (2006.01)

(52) U.S. Cl.
CPC ............ *B60B 35/004* (2013.01); *B60B 27/026* (2013.01); *B62K 25/04* (2013.01); *B60B 35/005* (2013.01); *B62K 2206/00* (2013.01)

(58) Field of Classification Search
CPC .. B62K 25/02; B62K 2206/00; B60B 27/023; B60B 27/026; B60B 35/004; B60B 35/08
USPC .............................. 301/124.2, 124.1; 280/474
See application file for complete search history.

(56) References Cited

U.S. PATENT DOCUMENTS

| | | | | |
|---|---|---|---|---|
| 5,082,303 A * | 1/1992 | Duehring et al. | ............ | 280/288 |
| 6,089,675 A * | 7/2000 | Schlanger | ................. | 301/124.2 |
| 6,293,883 B1 * | 9/2001 | Ichida | .............................. | 474/82 |
| 6,669,306 B1 * | 12/2003 | Hara et al. | ................. | 301/110.5 |
| 7,467,477 B1 * | 12/2008 | Flemming | ....................... | 33/533 |
| 7,537,291 B2 * | 5/2009 | Hara | .......................... | 301/124.2 |
| 7,654,546 B2 * | 2/2010 | Watarai | ......................... | 280/279 |
| 7,654,548 B2 * | 2/2010 | Kanehisa et al. | ............. | 280/279 |
| 8,042,881 B2 | 10/2011 | Inoue et al. | | |
| 8,075,010 B2 * | 12/2011 | Talavasek et al. | ............. | 280/288 |
| 8,899,606 B2 * | 12/2014 | Cocalis | ....................... | 280/281.1 |
| 2008/0051237 A1 * | 2/2008 | Shahana | ......................... | 474/82 |
| 2008/0238027 A1 * | 10/2008 | Talavasek | .................. | 280/281.1 |
| 2009/0072613 A1 * | 3/2009 | Inoue et al. | .................... | 301/132 |
| 2009/0315295 A1 * | 12/2009 | Laird et al. | ..................... | 280/279 |
| 2012/0212040 A1 * | 8/2012 | Lorscheider | ............... | 301/124.1 |
| 2013/0241175 A1 * | 9/2013 | Talavasek et al. | .......... | 280/288.4 |

FOREIGN PATENT DOCUMENTS

DE    20 2009 000 904 U1    6/2010
DE    10 2013 101 330 A1    9/2013

* cited by examiner

*Primary Examiner* — Jason Bellinger

(74) *Attorney, Agent, or Firm* — Global IP Counselors

(57) ABSTRACT

A bicycle wheel securing structure comprises a wheel securing axle and a wheel securing bolt. The wheel securing axle has a first end and a second end. The wheel securing bolt has a bolt shaft and a bolt head. The bolt shaft is coupled to one of the first and second ends of the wheel securing axle. The wheel securing bolt has a frame engageable surface extending in a peripheral direction of the bolt head and is configured to be non-rotatably engaged with a bicycle frame.

11 Claims, 7 Drawing Sheets

BICYCLE WHEEL SECURING STRUCTURE

BACKGROUND

1. Field of the Invention

This invention generally relates to a bicycle wheel securing structure. More specifically, the present invention relates to a bicycle wheel securing structure used to attach the wheel securing axle to a bicycle frame (e.g., a rear fork or a front fork).

2. Background Information

A bicycle is generally provided with a main bicycle frame and a front fork that rotatably support a pair of wheels. The front fork is pivotally connected to a front end portion of the main bicycle frame. The main bicycle frame can have a rear fork that is integrally formed as part of the main bicycle frame or that is pivotally connected to a rear end portion of the main bicycle frame. Each of the front and rear forks includes a pair of fork legs. The two fork legs are arranged on opposite sides of a wheel with lower tip ends of the fork legs for rotationally supporting a wheel. Typically, the lower tip ends of the fork legs are provided with dropouts (open ended slots) or mounting openings for attaching the wheels.

In view of the above conventional technology, it will be apparent to those skilled in the art from this disclosure that there exists a need for an improved connection between a fork and a wheel securing axle of a hub. This invention addresses this need in the art as well as other needs, which will become apparent to those skilled in the art from this disclosure.

SUMMARY

Generally, the present disclosure is directed to various features of a bicycle wheel securing structure. In accordance with one aspect of the present invention, the bicycle wheel securing structure disclosed herein is configured such that the bicycle wheel securing structure does not protrude from the bicycle frame even if the width of the frame is relatively small. In accordance with another aspect of the present invention, the bicycle wheel securing structure disclosed herein is configured to prevent rotation of the wheel securing axle with respect to the bicycle frame.

In view of the state of the known technology and in accordance with one aspect of the present invention, a bicycle wheel securing structure is provided that basically comprises a wheel securing axle and a wheel securing bolt. The wheel securing axle has a first end and a second end. The wheel securing bolt has a bolt shaft and a bolt head. The bolt shaft is coupled to one of the first and second ends of the wheel securing axle. The wheel securing bolt has a frame engageable surface extending in a peripheral direction of the bolt head and is configured to be non-rotatably engaged with a bicycle frame.

In accordance with a second aspect of the present invention, the bicycle wheel securing structure according to the first aspect is configured so that the wheel securing bolt includes at least one of protrusion and recess extending in radial direction with respect to a bolt axis of the wheel securing bolt, and configured to engage a bicycle frame to prevent rotation of the wheel securing bolt relative to a bicycle frame while installed on a bicycle frame.

In accordance with a third aspect of the present invention, the bicycle wheel securing structure according to the first aspect is configured so that the wheel securing bolt is configured to be disposed within a mounting opening of a bicycle frame.

In accordance with a fourth aspect of the present invention, a bicycle wheel securing structure is provided that basically comprises a wheel securing axle, a wheel securing bolt and an anti-rotating member. The wheel securing axle has a first end and a second end. The wheel securing bolt has a bolt shaft and a bolt head. The bolt shaft is coupled to one of the first and second ends of the wheel securing axle. The wheel securing bolt has an engageable surface extending in a peripheral direction of the bolt head. The anti-rotating member is non-rotatably engaged with the engageable surface of the wheel securing bolt.

In accordance with a fifth aspect of the present invention, the bicycle wheel securing structure according to the fourth aspect is configured so that the engageable surface of the wheel securing bolt includes at least one of a first protrusion and a first recess extending in radial direction with respect to a bolt axis of the bolt head of the wheel securing bolt, and the at least one of the first protrusion and the first recess engaging the anti-rotating member to prevent rotation of the bolt head relative to the anti-rotating member.

In accordance with a sixth aspect of the present invention, the bicycle wheel securing structure according to the fourth aspect is configured so that the anti-rotating member has a mounting opening, and the wheel securing bolt is disposed within the mounting opening.

In accordance with a seventh aspect of the present invention, the bicycle wheel securing structure according to the sixth aspect further comprises an axial movement preventing member disposed within the mounting opening-of the anti-rotating member.

In accordance with an eighth aspect of the present invention, the bicycle wheel securing structure according to the fourth aspect is configured so that the anti-rotating member is configured to fix a rear derailleur hanger to a bicycle frame, In accordance with a ninth aspect of the present invention, the bicycle wheel securing structure according to the fifth aspect is configured so that the anti-rotating member includes at least one of a second protrusion and a second recess that engages the at least one of the first protrusion and the first recess of the wheel securing bolt.

In accordance with a tenth aspect of the present invention, the bicycle wheel securing structure according to the fourth aspect is configured so that the anti-rotating member is configured to be connected to a rear derailleur hanger.

In accordance with an eleventh aspect of the present invention, the bicycle wheel securing structure according to the fourth aspect is configured so that the mounting opening of the anti-rotating member includes an internal thread that is configured to be engaged with an external thread of a rear derailleur hanger.

In accordance with a twelfth aspect of the present invention, the bicycle wheel securing structure according to the fourth aspect is configured so that the one of the first and second ends of the wheel securing axle is configured to be disposed. within an opening of a rear derailleur hanger.

Various objects, features, aspects and advantages of the disclosed wheel securing structure will become apparent to those skilled in the art from the following detailed description, which, taken in conjunction with the annexed drawings, discloses preferred embodiments of a wheel securing structure in accordance with the present invention.

BRIEF DESCRIPTION OF THE DRAWINGS

Referring now to the attached drawings which from a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
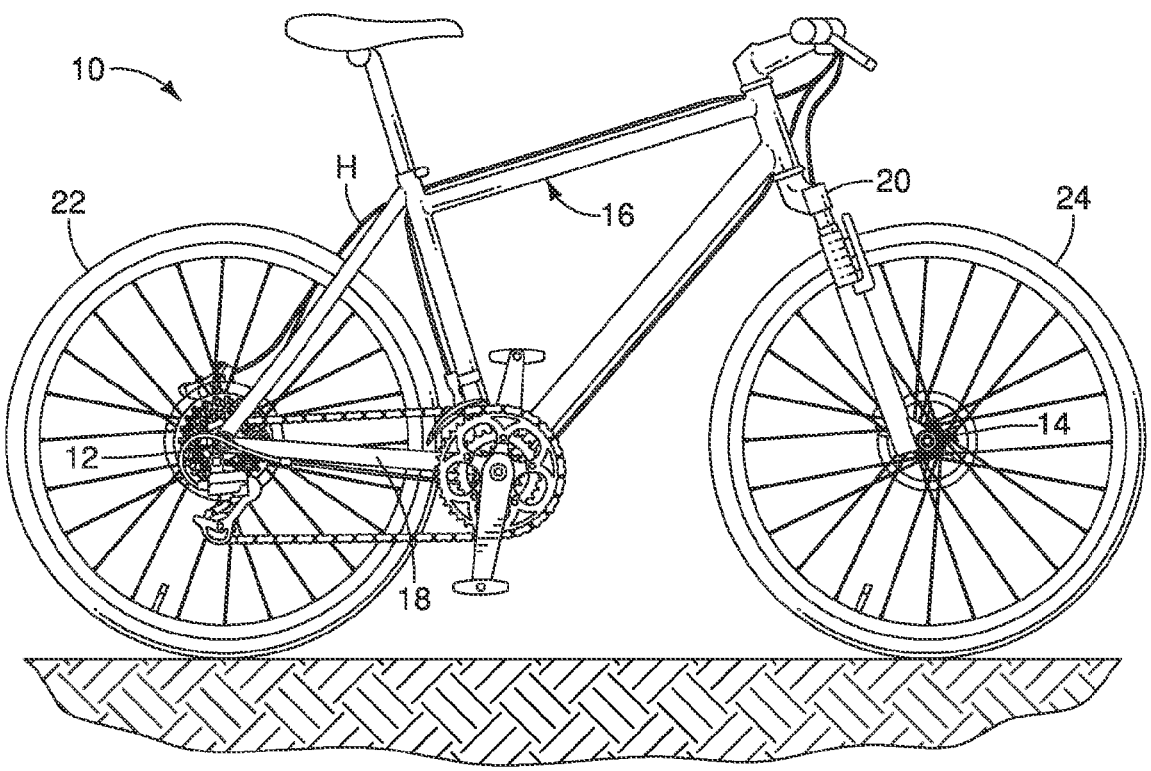
FIG. 1 is a side elevational view of a bicycle that is equipped with a pair of bicycle wheel securing structures in accordance with one embodiment.

Referring initially to FIG. 1, a bicycle 10 is illustrated having a first bicycle wheel securing structure 12 and a second bicycle wheel securing structure 14 in accordance with one embodiment. The bicycle 10 includes a main bicycle frame 16 having a rear portion 18 (e.g., a rear fork) and a front fork 20 (a sub-bicycle frame). The front fork 20 is pivotally mounted a head tube of the main bicycle frame 16 (hereinafter referred to as "the bicycle frame 16") in a conventional manner. The bicycle 10 further includes a rear wheel 22 and a front wheel 24. The rear wheel 22 is rotatably mounted to the rear portion 18 of the bicycle frame 16 by the first bicycle wheel securing structure 12 (hereinafter referred to as "the bicycle wheel securing structure 12"). The front wheel 24 is rotatably mounted to the front fork 20 by the second bicycle wheel securing structure 14 (hereinafter referred to as "the bicycle wheel securing structure 14").

Figure 2:
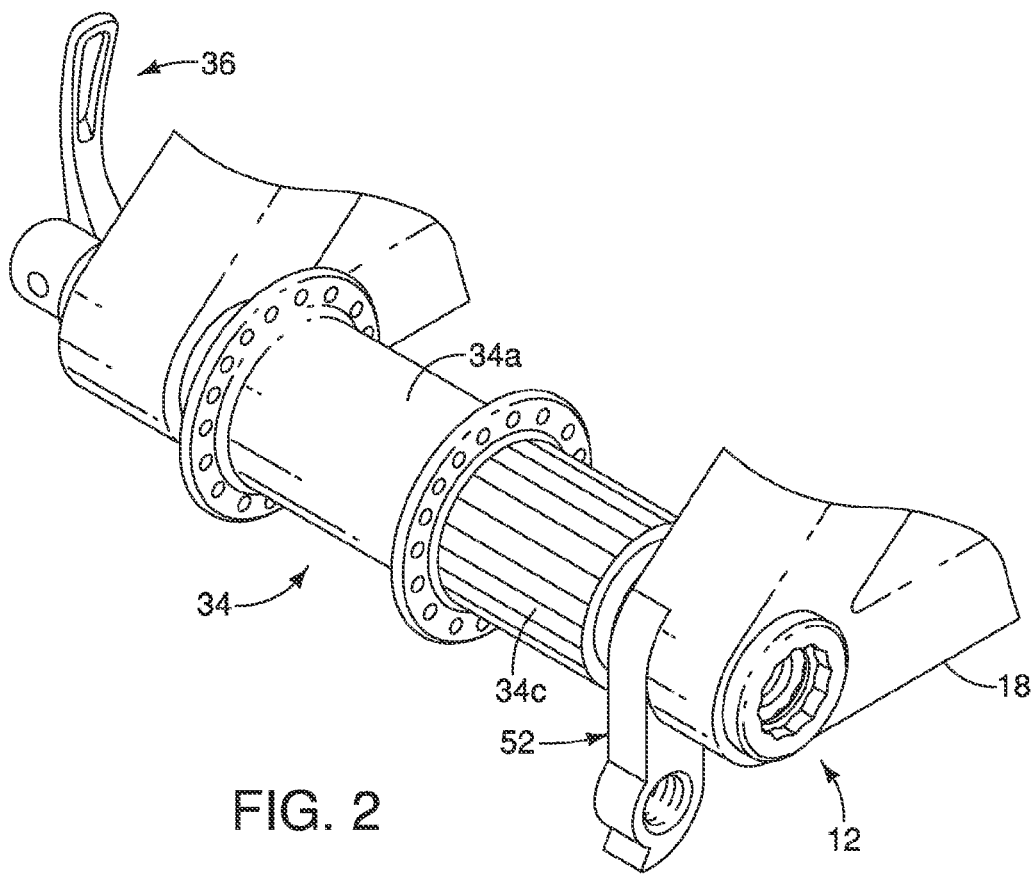
FIG. 2 is an enlarged perspective view of a rear portion of the main frame illustrated in FIG. 1 with the rear hub being supported on the rear portion of the main frame by one of the bicycle wheel securing structures.
Figure 3:
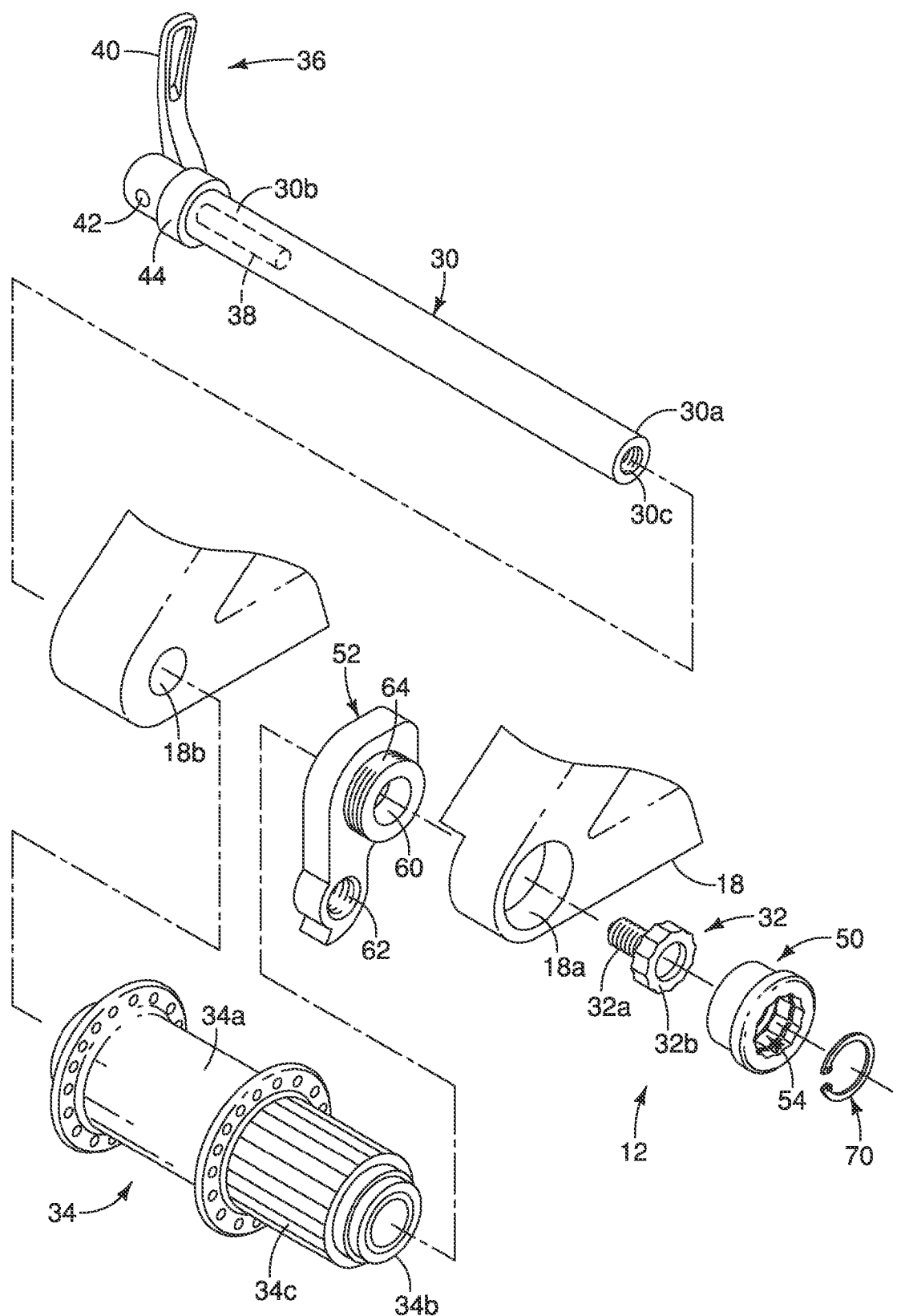
FIG. 3 is an exploded perspective view of the bicycle wheel securing structure illustrated in FIG. 2 shown relative to the rear portion of the frame and the rear hub.
Figure 4:
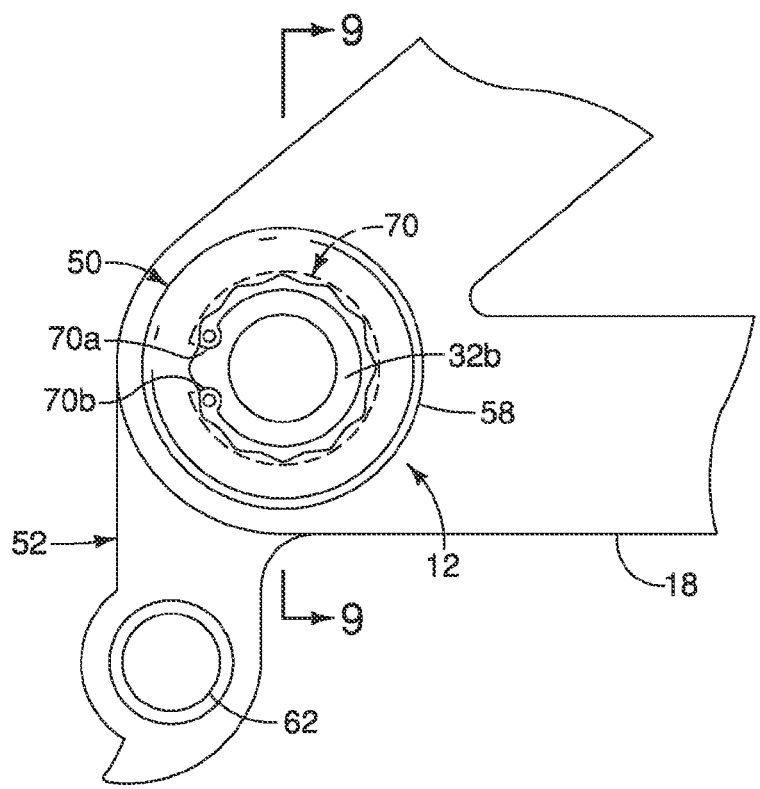
FIG. 4 is a side elevational view of the bicycle wheel securing structure illustrated in FIGS. 2 and 3, and installed to the rear portion of the frame.
Figure 5:
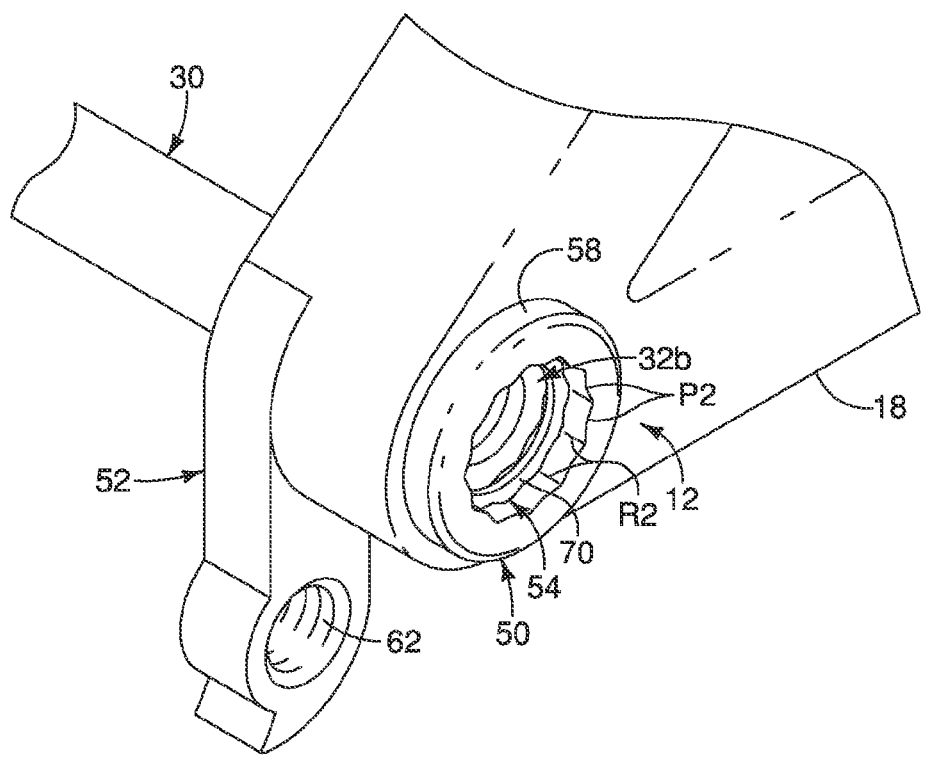
FIG. 5 is a perspective view of the bicycle wheel securing structure illustrated in FIGS. 2 to 4, and installed to the rear portion of the frame.
Figure 6:
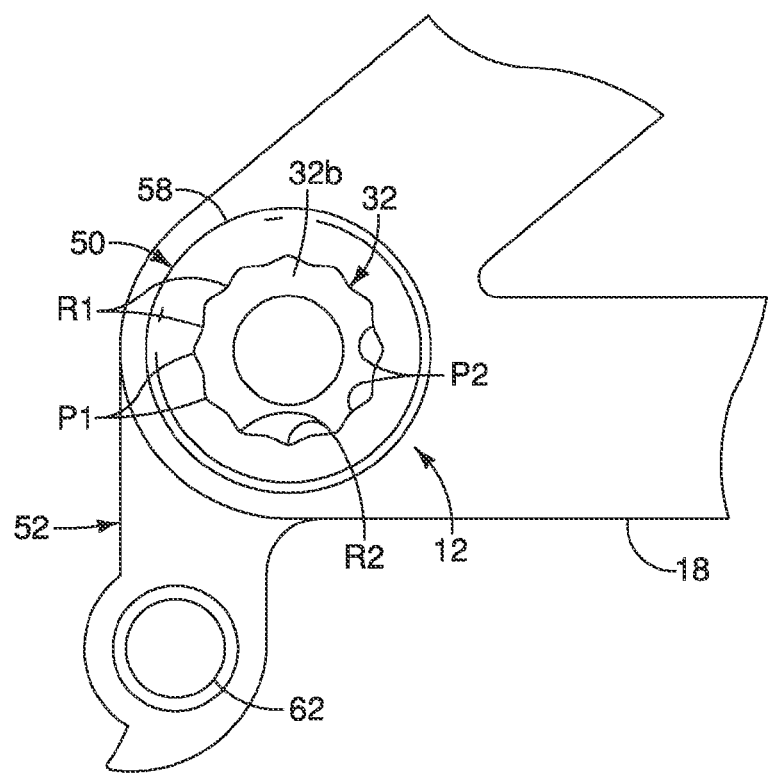
FIG. 6 is a side elevational view of the bicycle wheel securing structure illustrated in FIGS. 2 to 5, and installed to the rear portion of the frame, but with the axial movement preventing member disposed within the mounting opening of the anti-rotating member.
Figure 7:
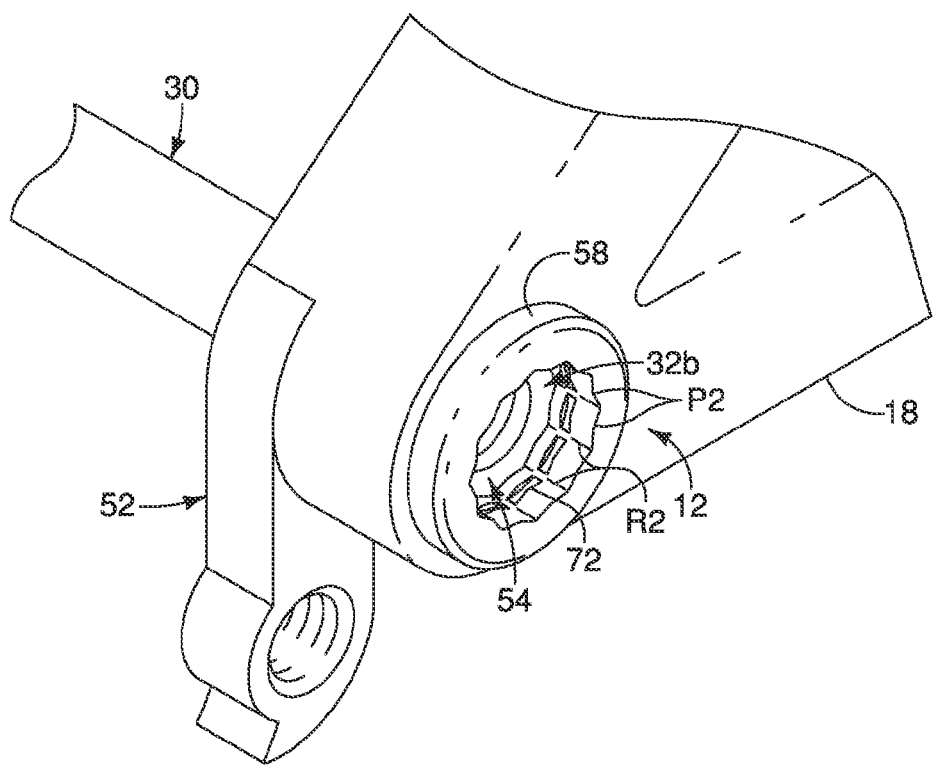
FIG. 7 is a perspective view of the bicycle wheel securing structure illustrated in FIGS. 2 to 6, and installed to the rear portion of the frame, but with the axial movement preventing member disposed within the mounting opening of the anti-rotating member.

Referring now to FIGS. 2 and 3, the bicycle wheel securing structure 12 basically comprises a wheel securing axle 30 and a wheel securing bolt 32. The wheel securing axle 30 is preferably a one-piece, unitary member that is formed of a hard rigid material such as a metal alloy. Similarly, the wheel securing bolt 32 is preferably a one-piece, unitary member that is formed of a hard rigid material such as a metal alloy. The bicycle wheel securing structure 12 further includes a rear hub 34 that is supported on the wheel securing axle 30. The rear hub 34 has a hub shell 34a that is rotatably mounted on a hub axle 34b by bearings (not shown). The hub axle 34b is a hollow tube. The wheel securing axle 30 extends through the huh axle 34b, and is located in mounting openings 18a and 18b of the rear portion 18 of the bicycle frame 16. In the illustrated embodiment, the rear hub 34 also includes a free wheel 34c for receiving a rear cassette (not shown) that has a plurality of gears. Rear hubs such as the rear hub 34 are well known in the bicycle field, and thus, the rear hub 34 will not be discussed in detail herein.

Basically, as best seen in FIG. 3, the wheel securing axle 30 has a first end 30a and a second end 30b. When the bicycle wheel securing structure 12 is mounted on the rear portion 18 of the bicycle frame 16 as seen in FIG. 2, the first end 30a of the wheel securing axle 30 is disposed within the mounting opening 18a of the rear portion 18 of the bicycle frame 16, and the second end 30b of the wheel securing axle 30 is disposed within a mounting opening 18b of the rear portion 18 of the bicycle frame 16. The first end 30a of the wheel securing axle 30a is provided with a threaded hole 30c for attaching the wheel securing bolt 32. The second end 30b of the wheel securing axle 30 is provided with a locking arrangement 36.

For example, as seen in FIG. 3, the locking arrangement 36 basically includes a shaft attachment member 38, a cam lever 40, a cam pin 42 and a cam cap 44. In this illustrated embodiment, the shaft attachment member 38 is threaded into a threaded bore of the second end 30b of the wheel securing axle 30 for attaching the locking arrangement 36 to the second end 30b of the wheel securing axle 30. The cam lever 40 is pivotally mounted to the shaft attachment member 38 by the cam pin 42. The cam cap 38 surrounds a cam portion of the cam pin 42. The can cap 44 moves axially back and forth relative to the second end 30b when the cam lever 40 is moved between a release or open position (not shown) and a clamping or closed position in a conventional manner. Thus, the locking arrangement 36 selectively locks the bicycle wheel securing structure 12 to the bicycle frame 16. This locking arrangement 36 is known in the bicycle field, and thus, the locking arrangement 36 will not be discussed and/or illustrated in detail herein. One example of this type of locking arrangement is disclosed in U.S. Pat. No. 7,654,546, which is assigned to Shimano Inc.

Figure 9:
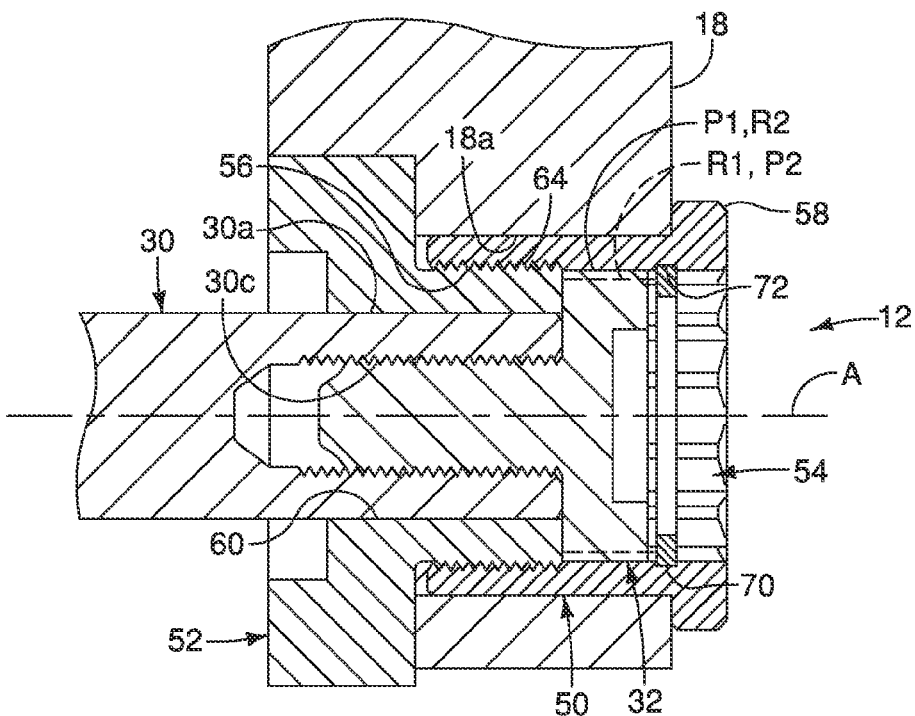
FIG. 9 is a partial cross sectional view of the bicycle wheel securing structure illustrated in FIGS. 2 to 8, taken along a section line 9-9 in FIG. 4.

As seen in FIGS. 3 and 9, the wheel securing bolt 32 is configured to be disposed within the mounting opening 18a of the rear portion 18 of the bicycle frame 16. The wheel securing bolt 32 has a bolt shaft 32a and a bolt head 32b. The wheel securing bolt 32 has an engageable surface 32c extending in a peripheral direction of the bolt head 32b. The engageable surface 32c of the wheel securing bolt 32 is configured to be non-rotatably arranged with respect to the bicycle frame 16 as explained below. The bolt shaft 32a is coupled to one of the first and second ends 30a and 30b of the wheel securing axle 30. In the illustrated embodiment, the bolt shaft 32a is a threaded shaft that is threaded into the threaded hole 30c of the first end 30a of the wheel securing axle 30.

In the illustrated embodiment, the bicycle wheel securing structure 12 further comprises an anti-rotating member 50, which is non-rotatably engaged with the frame engageable surface 32c of the wheel securing bolt 32. The anti-rotating member 50 is preferably a one-piece, unitary member that is formed of a hard rigid material such as a metal alloy. The anti-rotating member 50 is configured to be connected to a rear derailleur hanger 52. More specifically, the anti-rotating member 50 is configured to fix the rear derailleur hanger 52 to the bicycle frame 16. The anti-rotating member 50 is basically a tubular nut that has a mounting opening 54. In the illustrated embodiment, as best seen in FIG. 9, the mounting opening 54 has an internal thread 56 for attaching the rear derailleur hanger 52, The wheel securing bolt 32 is disposed within the mounting opening 54 such that the bolt head 32b directly contacts the anti-rotating member 50. In particular, the anti-rotating member 50 is non-rotatably engaged with the engageable surface 32c of the wheel securing bolt 32. In this way, the engageable surface 32c of the wheel securing bolt 32 is configured to be non-rotatably with respect to the bicycle frame 16. The wheel securing bolt 32 is not press fitted into the mounting opening 54 of the anti-rotating member 50. Thus, the wheel securing bolt 32 can be moved in a rotational direction with respect to the bore axis A within the mounting opening 54 slightly when the locking arrangement 36 is unlock (i.e., the cam lever 40 is not in the clamping or closed position). In other words, a small amount of relative rotational play can occur between the wheel securing bolt 32 and the anti-rotating member 50 with respect to the bore axis A white the locking arrangement 36 is unlock (i.e., the cam lever 40 is not in the clamping or closed position), The anti-rotating member 50 has an abutment member 58 for contacting the rear portion 18 of the bicycle frame 16.

Figure 8:
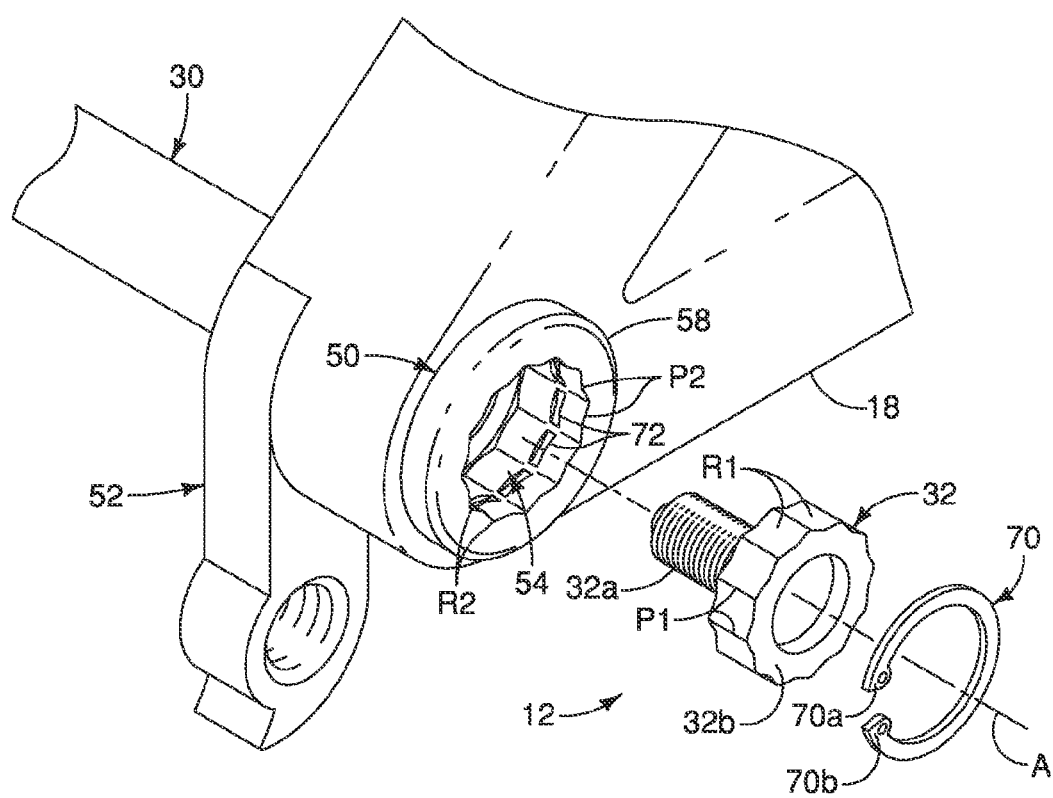
FIG. 8 is a partially exploded perspective view of the bicycle wheel securing structure illustrated in FIGS. 2 to 7.

More specifically, as seen in FIGS. 8 and 9, the wheel securing bolt 32 includes at least one of a first protrusion P1 and a first recess R1. In the illustrated. embodiment, the frame engageable surface 32c of the wheel securing bolt 32 includes a plurality of the first protrusions P1 and a plurality of the first recesses R1. The first protrusions P1 and the first recesses R1 extend in radial direction with respect to a bolt axis A of the bolt head 32b of the wheel securing bolt 32. The first protrusions P1 and the first recesses R1 engage the anti-rotating member 50 to prevent rotation of the bolt head 32b relative to the anti-rotating member 50. The anti-rotating member 50 includes at least one of a second protrusion P2 and a second recess R2. In the illustrated embodiment, the anti-rotating member 50 includes a plurality of the second. protrusions P2 and a plurality of the second recesses R2. In any case, at least one of the second protrusions P2 and the second recesses R2 engages at least one of the first protrusions P1 and the first recesses R1 of the wheel securing bolt 32. Thus, the frame engageable surface 32c of the wheel securing bolt 32 is configured to engage the bicycle frame 16 to prevent rotation of the wheel securing bolt 32 relative to the bicycle frame 16 while installed on the bicycle frame 16. It will be apparent from this disclosure that the frame engageable surface 32c of the wheel securing bolt 32 may only include one of first protrusion or one first recess and the anti-rotating member 50 may only include one second protrusion P2 or one second recess that mates with the one first protrusion or the one first recess if needed and/or desired.

As seen in FIG. 3, the rear derailleur hanger 52 is preferably a one-piece, unitary member that is formed of a hard rigid material such as a metal alloy. The rear derailleur hanger 52 has an opening 60 for receiving the wheel securing axle 30 therein. In particular, the one of the first and second ends 30a and 30b of the wheel securing axle 30, which is attached to the wheel securing bolt 32, is configured to be disposed within the opening 60 of the rear derailleur hanger 52. In other words, in illustrated embodiment, the first end 30a of the wheel securing axle 30 is configured to be disposed within the opening 60 of the rear derailleur hanger 52. The opening 60 is a non-threaded bore that has a step shape with the larger cylindrical portion receiving the hub axle 34b and the smaller cylindrical portion receiving the wheel securing axle 30. The rear derailleur hanger 52 also has an internally threaded bore 62. and an externally threaded attachment portion 64. The internally threaded bore 62 is used to attach a rear derailleur to thereto. As seen in FIG. 9, the externally threaded attachment portion has an external thread 64 that threadedly engages the internal thread 56 of the mounting opening 54 of the anti-rotating member 50 within the mounting opening 18a of the rear portion 18 of the bicycle frame 16. The rear derailleur hanger 52 contacts an inside surface of the bicycle frame 16 in the bore axis A direction and in rotational direction with respect to the bore axis A, therefore the position of the rear derailleur hanger 52 is fixed by the anti-rotating member 50. The mounting opening 54 of the anti-rotating member 50 includes the internal thread 56 that is configured to be engaged with the external thread 64 of the rear derailleur hanger 52.

In the illustrated embodiment, the bicycle wheel securing structure 12 further comprises an axial movement preventing member 70. The axial movement preventing member 70 is disposed within the mounting opening 54 of the anti-rotating member 50. Here, the axial movement preventing member 70 is a retaining clip, i.e., a C-clip. The axial movement preventing member 70 has two ends which have a tool engagement portions 70a and 70b, respectively, for removing from the axial movement preventing member 70 from the anti-rotating member 50. For example, each of the tool engagement portions 70a and 70b has an opening (through hole) for receiving a portion of a tool for removing from the axial movement preventing member 70 from the anti-rotating member 50. However, other types of retaining members can be used as needed and/or desired. Preferably, the axial movement preventing member 70 is a one-piece, unitary member that is formed of a hard rigid material such as a metal alloy. The second protrusion P2 are each provided with a recess 72 for receiving and retaining the axial movement preventing member 70 with the mounting opening 54 of the anti-rotating member 50. When the bicycle wheel securing structure 12 is fully assembled, the end face of the bolt head 32b of the wheel securing bolt 32 contacts or adjacent the axial movement preventing member 70 such that the wheel securing bolt 32 does not become loose.

Figure 10:
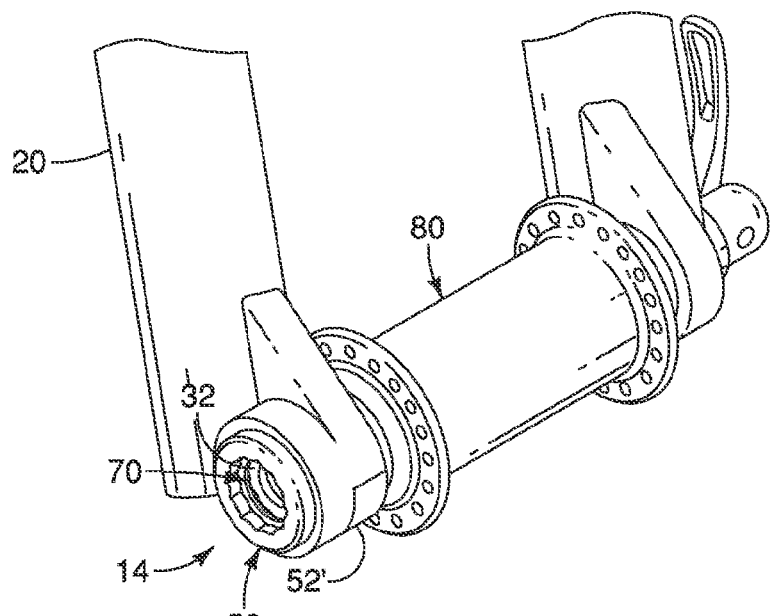
FIG. 10 is a perspective view of a lower portion of the front fork illustrated in FIG. 1 with the front hub being supported on the front fork by one of the bicycle wheel securing structures.
Figure 11:
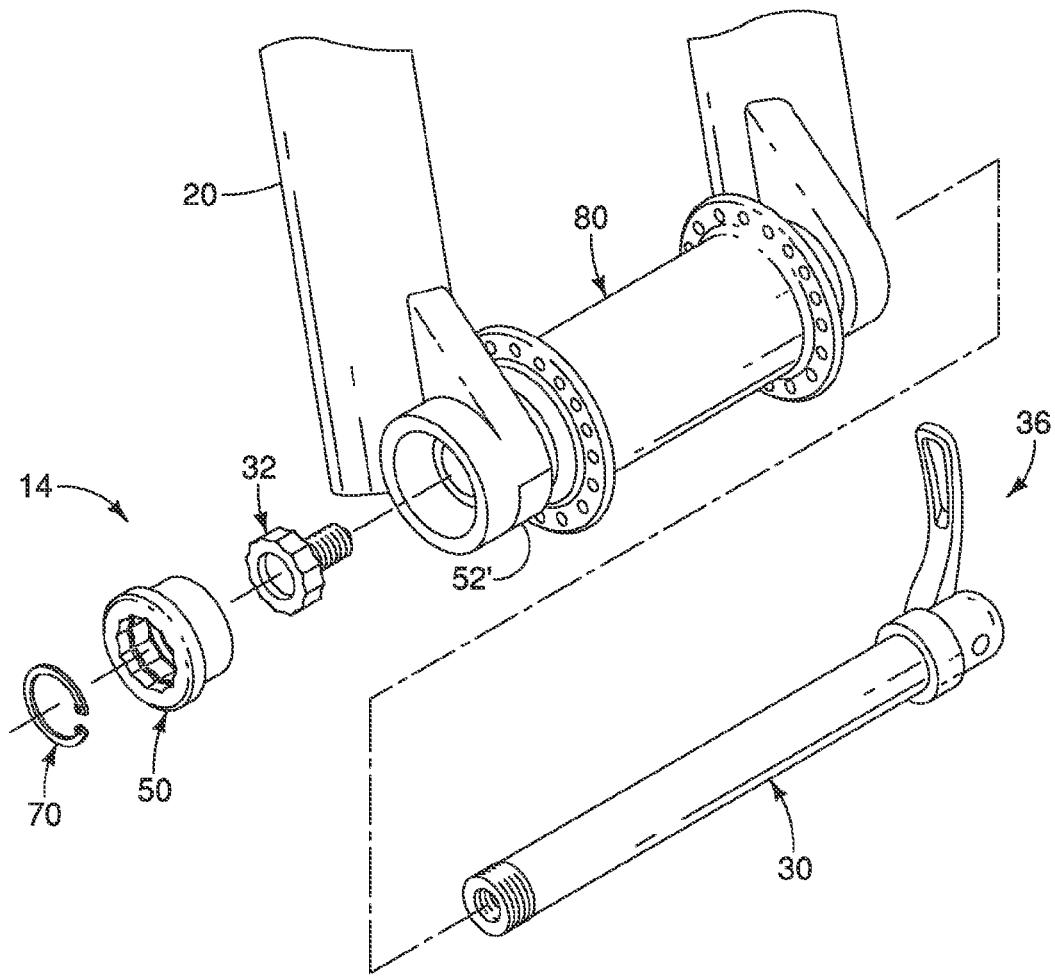
FIG. 11 is an exploded perspective view of the bicycle wheel securing structure illustrated in FIG. 10 shown relative to the lower portion of the front fork of the frame and the front hub.

Referring now to FIGS. 10 and 11, the bicycle wheel securing structure 14 will now be explained. The bicycle wheel securing structure 114 basically comprises the wheel securing axle 30, the wheel securing bolt 32 and the axial movement preventing member 70, which are discussed above, and further includes an attachment member 52. The bicycle wheel securing structure 14 is identical to the bicycle wheel securing structure 12, except that the rear derailleur hanger 52 has been replaced with attachment member 52' in the bicycle wheel securing structure 14. In view of the similarity between the bicycle wheel securing structures 12 and 14, the parts of the bicycle wheel securing structure 14 that are identical to the parts of the bicycle wheel securing structure 14 will be given the same reference numerals as the parts of the bicycle wheel securing structure 12. Moreover, the descriptions of the parts of the bicycle wheel securing structure 14 that are identical to the parts of the bicycle wheel securing structure 12 will be omitted for the sake of brevity. The attachment member 52' is identical to the rear derailleur hanger 52, except that the portion of the rear derailleur hanger 52 used for attaching a rear derailleur has been removed. Of course, the relative dimensions of the parts of the bicycle wheel securing structure 14 can be changed with respect to the dimensions of the parts of the bicycle wheel securing structure 12, if needed and/or desired, to better accommodate the bicycle wheel securing structure 14 being used with the front fork 20 and a front hub 80.

Figure 12:
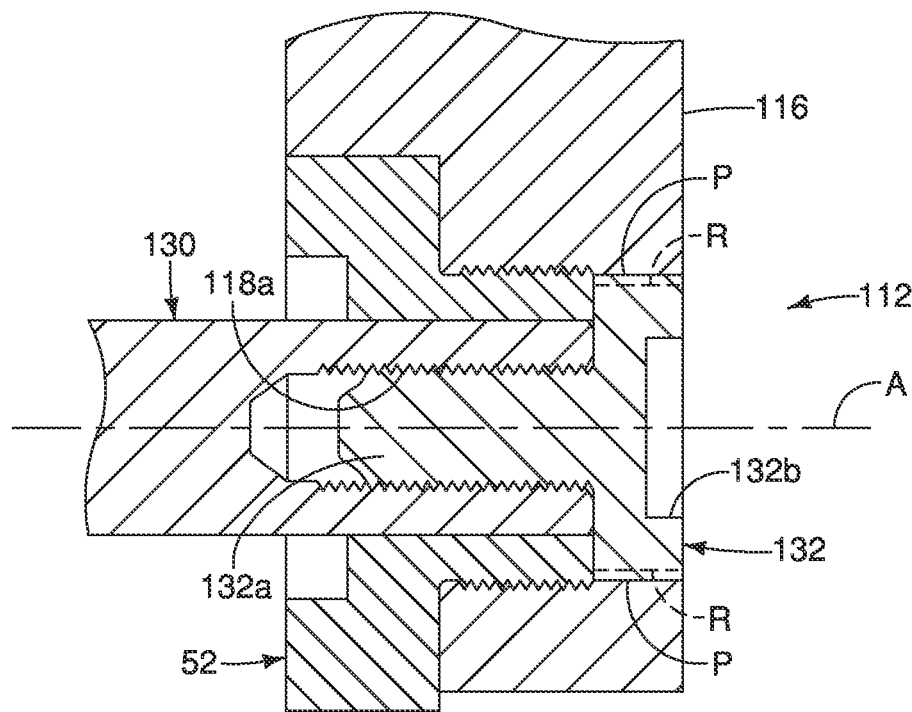
FIG. 12 is a partial cross sectional view, similar to FIG. 9, of a bicycle wheel securing structure in accordance with another embodiment.

Referring now to FIG. 12, a partial cross sectional view of a bicycle wheel securing structure 112 will now be explained in accordance with another embodiment. Basically, the bicycle wheel securing structure 112 basically comprises a wheel securing axle 130 and a wheel securing bolt 132. In this embodiment, the anti-rotating member of the prior embodiment is not used. Rather, the wheel securing bolt 132 has been modified in this embodiment to directly contact a bicycle frame 116. The wheel securing axle 130 is identical the wheel securing axle 30, which is discussed above. Also the derailleur hanger 52 is installed in a mounting opening 118a of the bicycle frame 116. Thus, only the wheel securing bolt 132 will be discussed.

The wheel securing bolt 132 has a bolt shaft 132a, a bolt head 132b and a frame engageable surface 132c. The frame engageable surface 132c extends in a peripheral direction of the bolt head 132b. The frame engageable surface 132c is configured to be non-rotatably engaged with an internal surface of the mounting opening 118a of the bicycle frame 116. The wheel securing bolt 132b includes at least one of protrusion P and recess R extending in radial direction with respect to the bolt axis A of the wheel securing bolt 132. Here the bolt head 132b is provided with a plurality of the protrusions P and the recesses R in the same manner as the wheel securing bolt 32. The protrusions P and the recesses R are configured to engage corresponding protrusions and the recesses of the bicycle frame 116 to prevent rotation of the wheel securing bolt 132 relative to the bicycle frame 116 while installed on the bicycle frame 116. The wheel securing bolt 132 is configured to be disposed within the mounting opening 118a of the bicycle frame 116. The mounting opening 118a of the bicycle frame 116 has the same configuration as the mounting opening 54 of the anti-rotating member 50.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Further, the terms "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied. by such feature(s). Thus, the foregoing descriptions of the embodiments according to the present invention are provided for illustration only, and not for the purpose of limiting the invention as defined by the appended claims and their equivalents.

What is claimed is:

1. A bicycle wheel securing structure comprising:
    a wheel securing axle having a first end and a second end;
    a wheel securing bolt having a bolt shaft and a bolt head, the bolt shaft being coupled to one of the first and second ends of the wheel securing axle, the wheel securing bolt having a frame engageable surface extending in a peripheral direction of the bolt head and being configured to be non-rotatably engaged with a bicycle frame; and
    a rear derailleur hanger having an opening configured to receive the wheel securing axle and an externally threaded portion that engages the bicycle frame.

2. The bicycle wheel securing structure according to claim 1, wherein
    the wheel securing bolt includes at least one of a protrusion and a recess extending in a radial direction with respect to a bolt axis of the wheel securing bolt, and configured to engage the bicycle frame to prevent rotation of the wheel securing bolt relative to the bicycle frame while installed on the bicycle frame.

3. The bicycle wheel securing structure according to claim 1, wherein
    the wheel securing bolt is configured to be disposed within a mounting opening of the bicycle frame.

4. A bicycle wheel securing structure comprising:
    a wheel securing axle having a first end and a second end;
    a wheel securing bolt having a bolt shaft and a bolt head, the bolt shaft being coupled to one of the first and second ends of the wheel securing axle, the wheel securing bolt having an engageable surface extending in a peripheral direction of the bolt head; and
    an anti-rotating member non-rotatably engaged with the engageable surface of the wheel securing bolt, the anti-rotating member having a mounting opening configured to receive the wheel securing bolt, the anti-rotating member further having a tubular portion with an external annular surface that is configured to engage a bicycle frame.

5. The bicycle wheel securing structure according to claim 4, wherein
the engageable surface of the wheel securing bolt includes at least one of a first protrusion and a first recess extending in a radial direction with respect to a bolt axis of the bolt head of the wheel securing bolt, and the at least one of the first protrusion and the first recess engaging the anti-rotating member to prevent rotation of the bolt head relative to the anti-rotating member.

6. The bicycle wheel securing structure according to claim 4, further comprising
an axial movement preventing member disposed within the mounting opening of the anti-rotating member.

7. The bicycle wheel securing structure according to claim 4, wherein
the anti-rotating member is configured to fix a rear derailleur hanger to a bicycle frame.

8. The bicycle wheel securing structure according to claim 5, wherein
the anti-rotating member includes at least one of a second protrusion and a second recess that engages the at least one of the first protrusion and the first recess of the wheel securing bolt.

9. The bicycle wheel securing structure according to claim 4, wherein
the anti-rotating member is configured to be connected to a rear derailleur hanger.

10. The bicycle wheel securing structure according to claim 4, wherein
the mounting opening of the anti-rotating member includes an internal thread that is configured to be engaged with an external thread of a rear derailleur hanger.

11. The bicycle wheel securing structure according to claim 4, wherein
the one of the first and second ends of the wheel securing axle is configured to be disposed within an opening of a rear derailleur hanger.

\* \* \* \* \*